Figure 1:
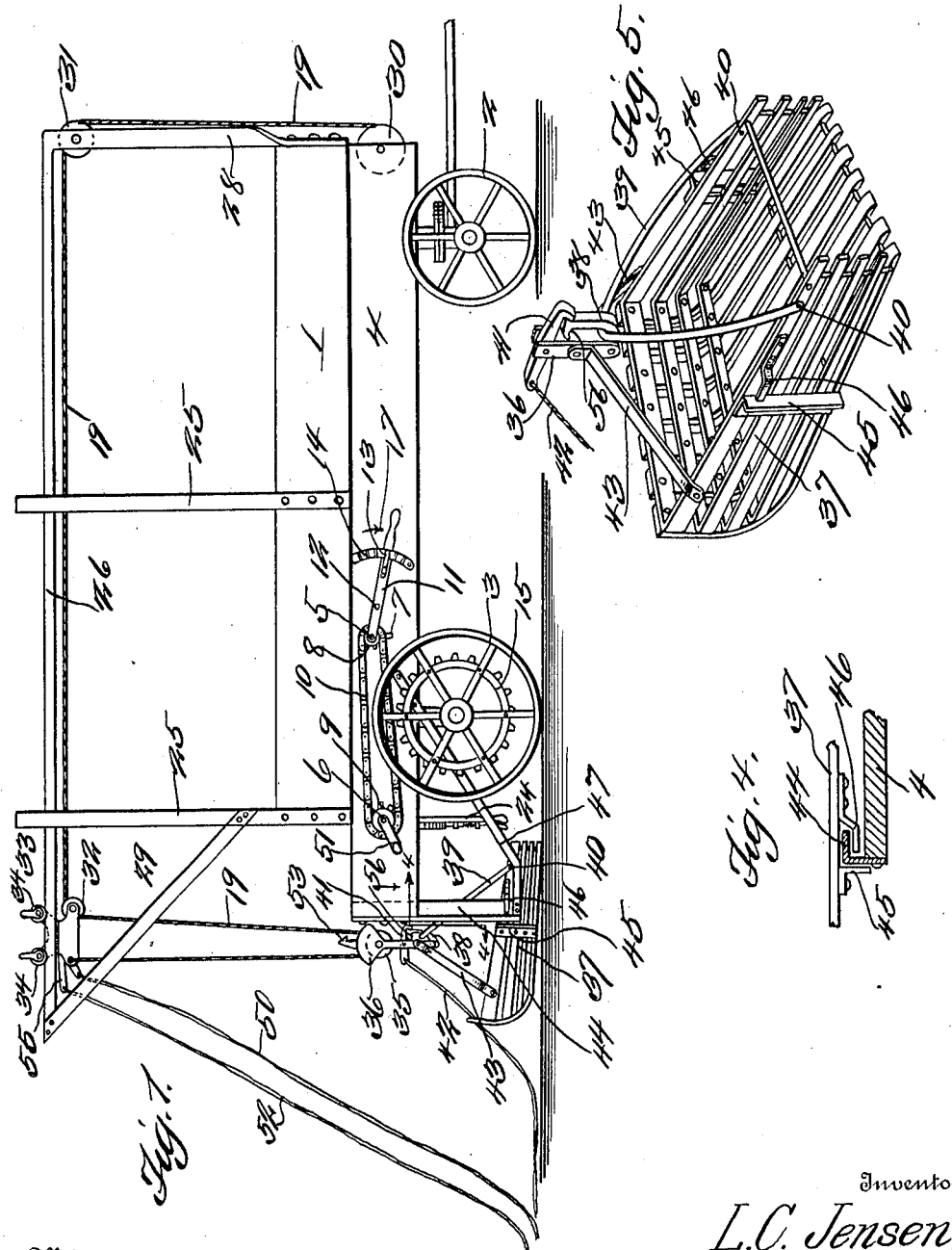

L. C. JENSEN.
BEET AND VEGETABLE LOADER.
APPLICATION FILED JUNE 3, 1911.

1,020,426.

Patented Mar. 19, 1912.
3 SHEETS—SHEET 1.

Witnesses
Francis G. Boswell
R. Cot

Inventor
L.C. Jensen,
By D. Swift &c.
Attorney

L. C. JENSEN.
BEET AND VEGETABLE LOADER.
APPLICATION FILED JUNE 3, 1911.

1,020,426.

Patented Mar. 19, 1912.
3 SHEETS—SHEET 3.

Witnesses
Francis T. Boswell
R. Cox

Inventor
L. C. Jensen
By D. Swift &C.
Attorney

L. C. JENSEN.
BEET AND VEGETABLE LOADER.
APPLICATION FILED JUNE 3, 1911.

1,020,426.

Patented Mar. 19, 1912.
3 SHEETS—SHEET 3.

Witnesses
Francis G. Boswell
R. Cot

Inventor
L. C. Jensen,
By D. Swift & Co.
Attorney

UNITED STATES PATENT OFFICE.

LARS CHRISTEN JENSEN, OF COWLEY, WYOMING.

BEET AND VEGETABLE LOADER.

1,020,426.   Specification of Letters Patent.   Patented Mar. 19, 1912.

Application filed June 3, 1911. Serial No. 631,188.

*To all whom it may concern:*

Be it known that I, LARS C. JENSEN, a citizen of the United States, residing at Cowley, in the county of Bighorn and State of Wyoming, have invented a new and useful Beet and Vegetable Loader; and I do hereby declare the following to be a full, clear, and exact description of the invention, such as will enable others skilled in the art to which it appertains to make and use the same.

This invention relates to the art of loading and dumping, and it particularly pertains to a new and useful sugar beet loader.

The invention in its broadest scope aims as its primary object to provide a loader of this nature, in which there are involved novel features of construction.

Another object of the invention is to provide a loader, the fork of which may be hoisted as the loader is making its return trip over the row of beets, which have been excavated on the forward trip. The fork may not only be hoisted, but may be moved to any position over the body of the wagon where the fork may be released, so as to dump its contents. The fork may be hoisted and moved over the body of the wagon, by manually manipulating a cranking device, instead of hoisting the fork as the loader makes its return trip.

A further feature of the invention is the provision of means for throwing the hoisting mechanism out of gear.

In the drawings, there is disclosed only one form of the present invention, but in practical fields this form may require alterations, to which the applicant is entitled, provided the alterations are comprehended by the appended claims.

The invention comprises further features and combination of parts, as hereinafter set forth, shown in the drawings, and claimed.

Figure 2:
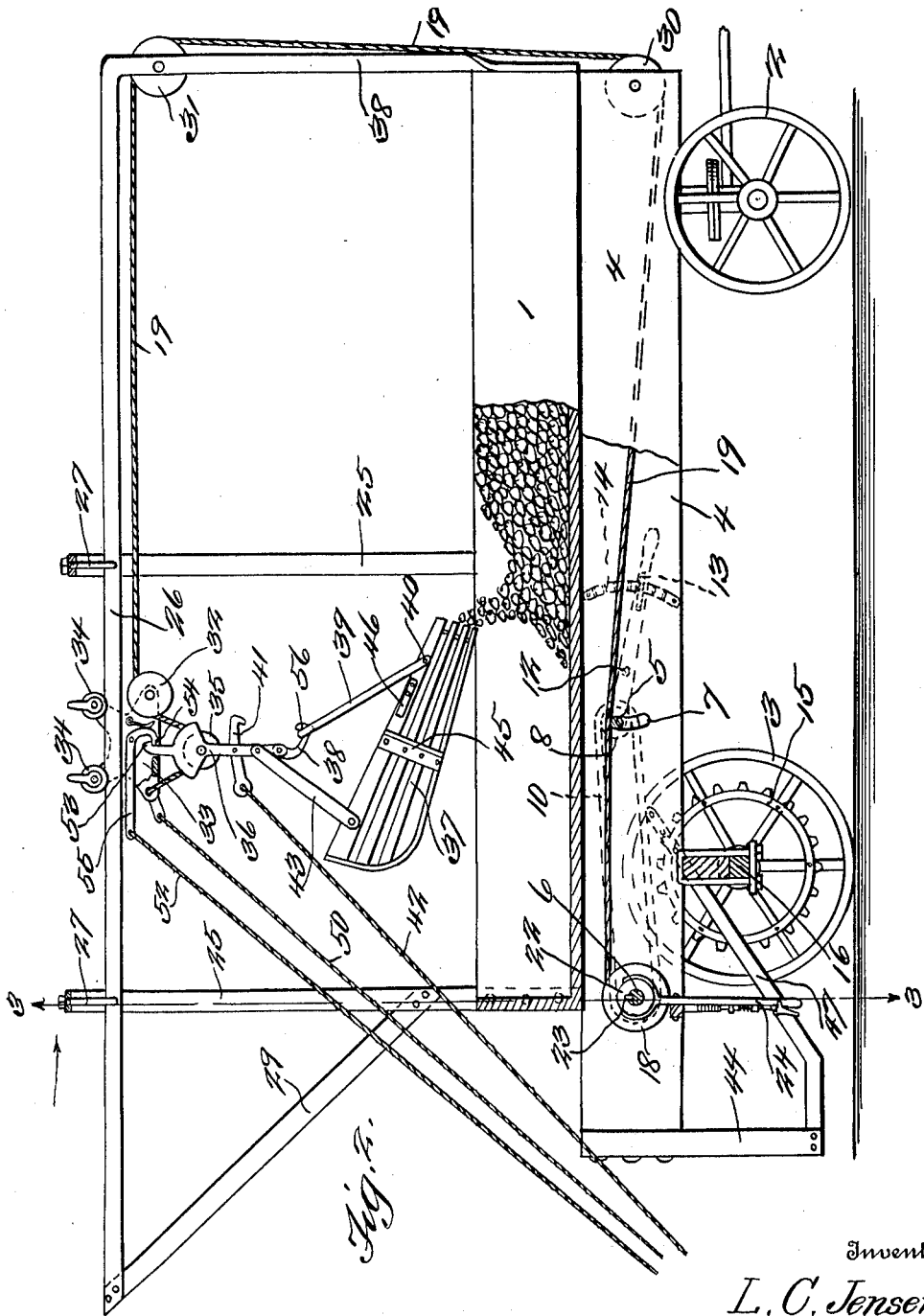
Figure 3:
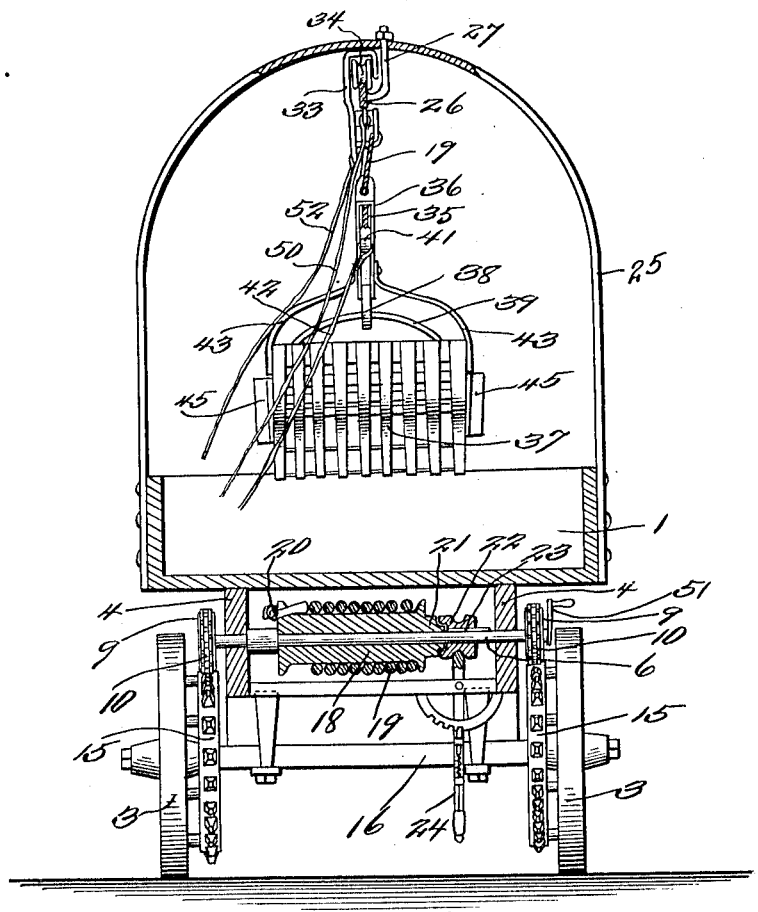

In the drawings:—Figure 1 is a view in side elevation of a loader, constructed in accordance with the invention. Fig. 2 is a longitudinal sectional view through the loader, showing the fork hoisted. Fig. 3 is a transverse sectional view on line 3—3 of Fig. 1. Fig. 4 is a transverse sectional view on line 4—4 of Fig. 1. Fig. 5 is a detail view of the fork.

Referring more particularly to the drawings 1 designates the usual form of wagon body, which is provided with the forward wheels 2, and the usual rear drive wheels 3. The wagon body 1 is supported on the beams 4, in bearings of which transversely disposed shafts 5 and 6 are journaled. The bearings of the shaft 5 are in the form of short slots 7. On each end of the shafts 5 and 6 sprockets 8 and 9 are mounted, over which the chains 10 travel. The shaft 5 has its ends journaled in bearings of the levers 11, which are pivoted as at 12. The free ends of the levers 11 are provided with spring actuated dogs 13, which are designed to coöperate with the teeth of the racks 14, which are secured upon either of the beams 4. The sprocket chains 10 not only pass over the sprocket wheels 8 and 9 but also engage the sprockets 15, upon the drive shaft 16 of the wheels 3. By moving the levers 11 in the direction of the arrow 17 the chains 10 may be thrown out of gear with the sprockets 15, and by moving the levers 11 in the reverse direction, the engagement between the chains 10 and the sprockets 15 may be increased.

Mounted on the shaft 6 is a drum 18, about which the cable 19 is wound, the same being connected to the drum as shown at 20. The drum 18 is loosely mounted on the shaft 6, as shown. A clutch member 21 is carried by the drum, so as to be coöperated with a clutch member 22, which is splined or keyed, as shown at 23, to the shaft 6, so as to rotate therewith, but capable of sliding thereon. By the provision of the clutch members, the drum 18 may be thrown into and out of gear with the shaft 6. A lever 24 is provided, for shifting the clutch member 22.

Arching over the wagon body are the arched members 25, from the arched portions of which the track 26 is suspended, by means of the members 27. The forward portion of the track 26 is extended downwardly as shown at 28, at right angles to the horizontal portion, and is connected to the wagon body as shown. The rear end of the track 26 is braced by the bars 29, which connect between the track 26 and the rear arched member 25.

The cable 19 passes from the drum 18 over the pulleys 30 and 31, and thence over the pulley 32, of the carriage 33. This carriage 33 is provided with anti-frictional wheels 34, which travel on the track 27. The cable 19 after passing over the pulley 32, passes under the pulley 35. The pulley 35 is carried by a casting 36, from which the fork 37 is suspended. The lower portion of the casting 36 is provided with a pivoted trip dog 38, designed for supporting the bail shape member 39, which is pivoted at 40 to the forward portion of the fork. The trip dog 38 is held in the position shown in Fig. 1 by the trip lever 41, which may be manipulated by the pull cord 42, that is, after the fork has been hoisted and moved forwardly of the wagon body. When the trip lever 41 is thus manipulated, the trip dog 38 is released, which in turn releases the bail shape member 39, thus allowing the fork to dump its contents. The rear portion of the fork is connected to the lower end of the casing 36 by the rods 43, as shown.

To hold the fork 37 in position when excavating sugar beets, guide angle irons 44 are secured to the rear ends of the beams 4, and are extended downward. The fork 37 is provided with members 45 and 46 between which the guide angle irons are arranged. These guide angle irons not only constitute means for holding the fork in position, but also act as guides for the fork, as the same is hoisted. To provide rigidity for the angle irons 44 braces 47 are connected between them and the beams 4. The braces 47 also insure additional rigidity for the fork.

In operation, the various parts of the loader are arranged as shown in Fig. 1, after which the loader is started forward over a row of sugar beets. As the loader passes over the beets, they are excavated and gathered by the fork. When the loader reaches the end of the row, the chains 10 are thrown in engagement with the gears 15, by manipulating the levers 11 in a direction opposite to that indicated by the arrow 17, then the drum 18 is thrown in gear with the shaft 6, and subsequently the loader is started back over the excavated row. As the loader travels back over the row, the fork 37 is hoisted and moved to the desired position over the wagon body or bed, as shown in Fig. 2. When the fork has reached the position shown in Fig. 2, a pulling action is imparted on the pull cord 42, which operates the trip lever 41, which in turn releases the trip dog, thus allowing the fork to dump its contents. After the fork has been relieved of its contents a pulling action is imparted to the pull cord 50, subsequently to throwing the drum out of gear with the shaft 6, so as to return the carriage 33 and the fork 37 to the rear portion of the track 36, at which point the fork may again be lowered to the position shown in Fig. 1. The fork may be hoisted forward of the wagon body bed manually, by operating the shaft 6 by the cranking device, that is, subsequently to throwing the drum in gear with the shaft 6, instead of throwing the chains 10 in engagement with the sprocket 15. The fork may also be returned to the position shown in Fig. 1 by reversing the cranking device 51 and also imparting a pulling action on the pull cord 50.

From the foregoing it will be apparent that there has been devised a novel, inexpensive, efficient and simple sugar beet loader, and one which has been found to be exceedingly practicable in construction and operation.

The invention having been set forth, what is claimed as new and useful is:—

1. In a sugar beet loader, a wagon body having a fork vertically movable and suspended from the rear portion of the wagon body, and means for hoisting and moving the fork forwardly of the wagon body, and guide angle irons for vertically guiding the fork as it is hoisted.

2. In a sugar beet loader, a wagon body having a fork vertically movable and suspended from the rear portion of the wagon body, and means of hoisting and moving the fork forwardly of the wagon body, and guide angle irons for vertically guiding the fork as it is hoisted, and means connecting between the guide angle irons and the wagon body for insuring rigidity for the angle iron and the fork.

3. In a sugar beet loader, a wagon body having a fork vertically movable and suspended from the rear portion of the wagon body, and means for hoisting and moving the fork forwardly of the wagon body, and means for releasing the fork to permit it to dump after being hoisted and moved forward, and means for throwing the fork hoisting and forwardly moving means out of gear to permit the fork to be returned to its initial position.

4. In a sugar beet loader, a wagon body having a fork vertically movable and suspended from the rear portion of the wagon body, and means for hoisting and moving the fork forwardly of the wagon body, and means for releasing the fork to permit it to dump after being hoisted and moved forward, means for throwing the fork hoisting and forwardly moving means out of gear to permit the fork to be returned to its initial position, guide angle irons for vertically guiding the fork as it is hoisted, a guide track suspended over the wagon body, and a carriage on the track, between which and the fork the hoisting and moving means coöperates.

5. In a sugar beet loader, a wagon body having a fork vertically movable and suspended from the rear portion of the wagon body, and means for hoisting and moving the fork forwardly of the wagon body, and means for releasing the fork to permit it to dump after being hoisted and moved forward, means for throwing the fork hoisting and forwardly moving means out of gear to permit the fork to be returned to its initial position, guide angle irons for vertically guiding the fork as it is hoisted, a guide track suspended over the wagon body, and a carriage on the track, between which and the fork the hoisting and moving means coöperates, and means connecting between the guide angle iron and the wagon body for insuring rigidity for the angle irons and the fork.

6. In combination, a wagon body having drive wheels provided with sprockets, a pair of shafts journaled in beams of the wagon body having gear connections between them and the sprockets of the drive wheels, means connected with one of the shafts for throwing the gear connection out of engagement with the sprockets, one of said shafts having a windlass mechanism including a clutch mechanism for throwing the windlass out of gear with the shaft, a track suspended longitudinally above the wagon body, a carriage thereon, a fork at the rear lower portion of the wagon body, means for guiding the fork when raised, cable connections between the windlass, the carriage and the fork, whereby the fork may be hoisted and moved forwardly of the track, and means for releasing the fork to permit it to dump.

In testimony whereof I have signed my name to this specification in the presence of two subscribing witnesses.

LARS CHRISTEN JENSEN.

Witnesses:
SOLOMON WARDELL,
L. A. MEEKS.

---

Copies of this patent may be obtained for five cents each, by addressing the "Commissioner of Patents, Washington, D. C."